(12) United States Patent
Müller (10) Patent No.: US 9,702,784 B2
(45) Date of Patent: Jul. 11, 2017

(54) APPARATUS FOR THE LAPPING OR TESTING OF GEARS

(71) Applicant: Klingelnberg AG, Zürich (CH)

(72) Inventor: Hartmuth Müller, Remscheid (DE)

(73) Assignee: KLINGELNBERG AG (CH)

( * ) Notice: Subject to any disclaimer, the term of this patent is extended or adjusted under 35 U.S.C. 154(b) by 0 days.

(21) Appl. No.: 14/549,014

(22) Filed: Nov. 20, 2014

(65) Prior Publication Data

US 2015/0135820 A1     May 21, 2015

(30) Foreign Application Priority Data

Nov. 20, 2013  (EP) .................................... 13193726

(51) Int. Cl.

| | |
|---|---|
| *G01M 13/02* | (2006.01) |
| *B23F 23/04* | (2006.01) |
| *B23F 23/12* | (2006.01) |
| *B23F 23/02* | (2006.01) |
| *B23F 23/06* | (2006.01) |
| *B23F 19/02* | (2006.01) |
| *B23F 17/00* | (2006.01) |

(52) U.S. Cl.
CPC ......... *G01M 13/021* (2013.01); *B23F 17/001* (2013.01); *B23F 19/02* (2013.01); *B23F 23/04* (2013.01); *B23F 23/1281* (2013.01); *B23F 23/02* (2013.01); *B23F 23/06* (2013.01)

(58) Field of Classification Search
CPC ... G01M 13/021; B23F 23/04; B23F 23/1281; B23F 23/02; B23F 23/06
See application file for complete search history.

(56) References Cited

U.S. PATENT DOCUMENTS

| | | | |
|---|---|---|---|
| 3,611,800 A | 10/1971 | Howlett et al. | |
| 4,678,393 A | 7/1987 | Mink | |
| 5,885,038 A * | 3/1999 | Huber | B23F 19/057 198/346.2 |
| 6,390,893 B1 * | 5/2002 | Stadtfeld | B23F 17/001 451/161 |

(Continued)

FOREIGN PATENT DOCUMENTS

| | | |
|---|---|---|
| CH | 582 038 | 8/1974 |
| DE | 29703157 U1 | 4/1997 |

(Continued)

*Primary Examiner* — Robert Huber
*Assistant Examiner* — John M Royston
(74) *Attorney, Agent, or Firm* — McCarter & English, LLP (57) ABSTRACT

An apparatus including a first spindle group for chucking a first gear, whereby the first gear is mountable on the first spindle group so that it is rotatable, and a second spindle group for chucking a second gear, whereby the second gear is mountable on the second spindle group so that it is rotatable. The apparatus further defining a first linear axis oriented to perform a first linear displacement of the first spindle group relative to the second spindle group; a second linear axis oriented to perform a second linear displacement of the first spindle group relative to the second spindle group; and at least one of a swivel axis oriented to perform pivoting of the first spindle group thereabout, and a swivel axis oriented to perform pivoting of the second spindle group thereabout.

11 Claims, 6 Drawing Sheets

(56) References Cited

U.S. PATENT DOCUMENTS

| | | | |
|---|---|---|---|
| 2006/0111018 A1* | 5/2006 | Kopp | B23F 17/001 451/5 |
| 2008/0056837 A1 | 3/2008 | McGlasson et al. | |
| 2010/0202847 A1* | 8/2010 | Moser | B23F 5/02 409/12 |
| 2011/0008119 A1* | 1/2011 | Neumaier | B23B 31/00 409/84 |

FOREIGN PATENT DOCUMENTS

| | | |
|---|---|---|
| EP | 0 263 947 | 8/1987 |
| JP | S47-012848 A | 6/1972 |
| JP | 2008114341 A | 5/2008 |
| WO | 2008030530 A2 | 3/2008 |

\* cited by examiner

APPARATUS FOR THE LAPPING OR TESTING OF GEARS

CROSS-REFERENCE TO RELATED APPLICATION

This application claims priority under 35 U.S.C. §§119 (a)-(d) to European Patent Application No. EP 13 193 726.0, filed Nov. 20, 2013, which is hereby incorporated by reference in its entirety as part of the present disclosure as if fully set forth herein.

FIELD OF THE INVENTION

Subject of the invention is an apparatus. In particular apparatus for carrying out measurements/examinations on work pieces and apparatus for the lapping of work pieces are concerned.

BACKGROUND OF EMBODIMENTS OF THE INVENTION

There are many measurement and testing methods which are being used in connection with the manufacturing of gear trains.

For some of these measurement and testing methods two gears are rotated (called engagement rotation) and put in engagement with each other, in order to be able to determine, for instance, how well these two gears can be paired with each other. In this way, the optimum mounting position can be determined.

In order to be able to carry out such measurement and testing methods on spiral gears, typically, in addition to the engagement rotation one or more relative displacement movements (herein called additional movements) are being applied.

Figure 1:
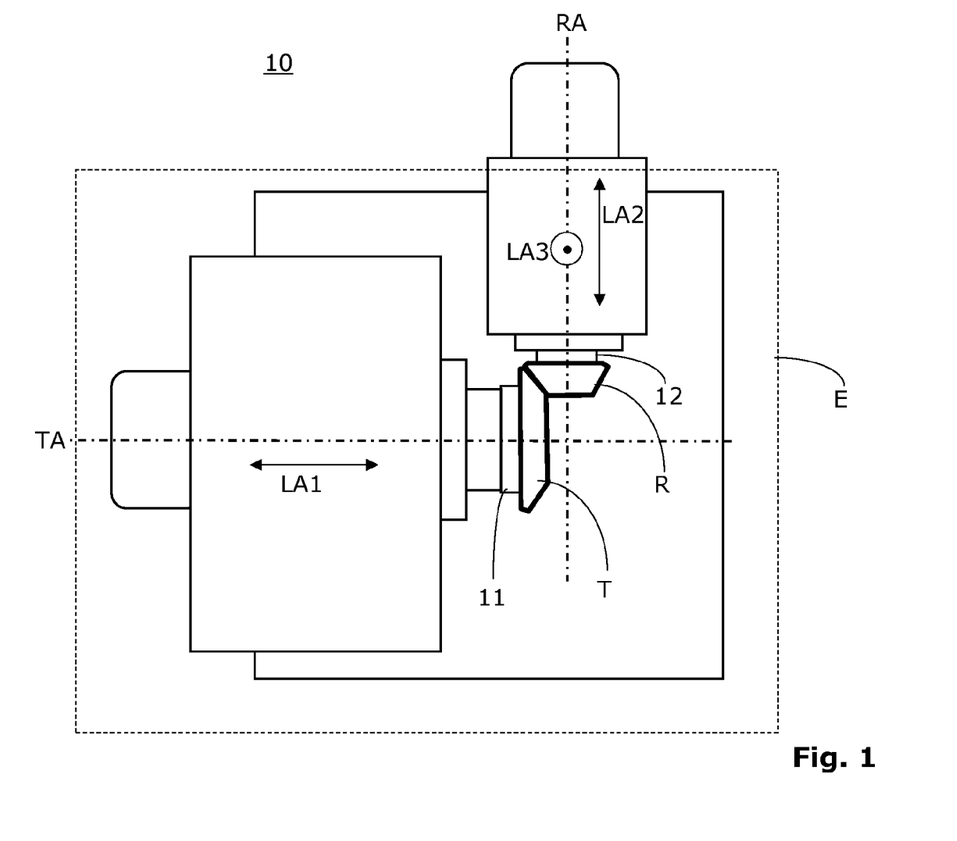
FIG. 1 shows a schematic top view of a conventional tester, which is designed in order to bring a pinion and a crown gear into engagement and to cause them to roll with each other.

The carrying out of such measurement and testing methods on spiral gears thus requires a special machine construction with corresponding axis. Such a machine is herein generally called testing machine or briefly tester. In FIG. 1 an exemplary tester 10 is shown in a very schematic form. A suitable tester 10 has a first spindle 11 for receiving a crown gear T, wherein the crown gear T in a chucked state is mounted so that it can be rotated about the gear axle TA. Furthermore, there is a second spindle 12 which is designed for receiving a pinion R. The second spindle 12 facilitates the rotation of the pinion R about the pinion axle RA.

The corresponding testers 10 comprise a total of five degrees of freedom in order to enable the engagement rotations and the mentioned additional movements between the pinion R and the crown gear T. Altogether, there are five axis provided here, namely two rotational axis TA, RA for the engagement rotation (in case of a tester 10 these are equipped with corresponding sensors, e.g. angular encoders) and three linear axis LA1, LA2, LA3.

The tester 10 enables a relative movement LA1 in the direction of the crown gear axle TA and a relative movement LA2 in the direction of the pinion axle RA. Typically, the distance (parallel to LA3) between the crown gear axle TA and the pinion axle RA can be adjusted in addition, which is referred to as third degree of freedom. The respective linear displacements are also used in order to adjust the mounting distance.

Figure 2:
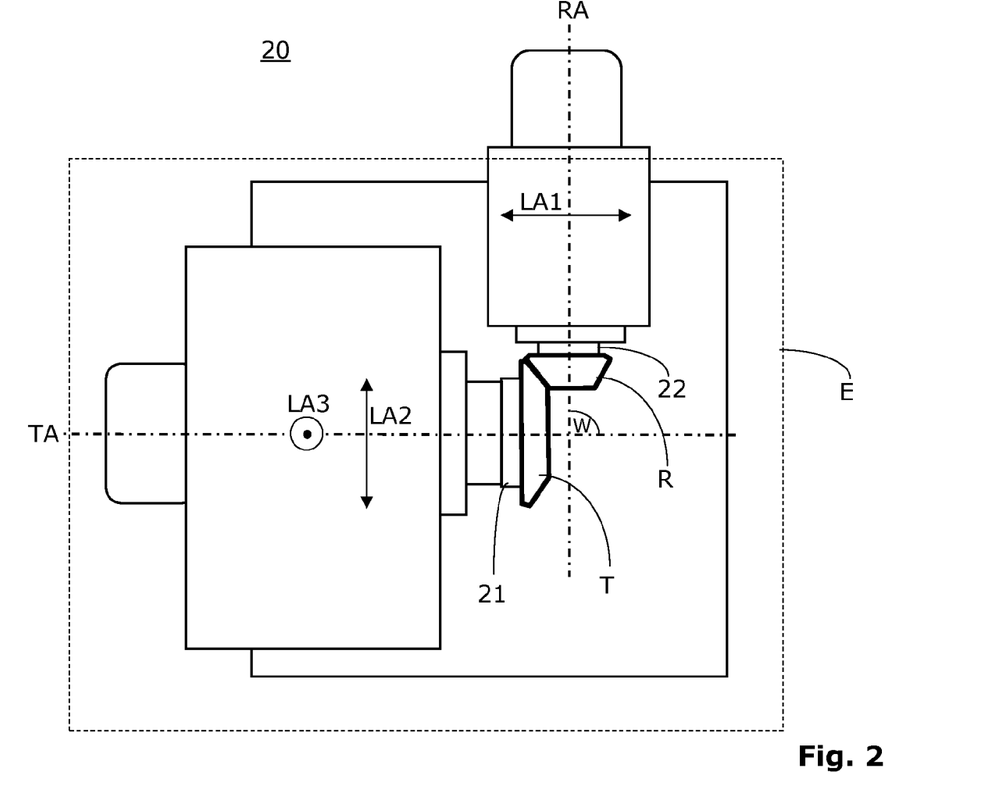
FIG. 2 shows a schematic top view of a conventional machine, which is designed in order to bring a pinion and a crown gear into engagement and to cause them to roll with each other.

In addition to the mentioned testing machines 10 there are also lapping machines 20 which have a comparable axis constellation with five degrees of freedom. Lapping is a method which is used for the final processing (finishing processing after the quenching) of the tooth flanks of bevel gear pairs (bevel gear trains). After a crown gear T was mounted on a first spindle 21 and a pinion R, which is to be paired therewith, was mounted on a second spindle 22, typically the pinion R is caused to rotate while the crown gear T being engaged with the pinion R runs along or is slowed down. A lapping fluid (e.g. an oil with silicon carbide) is employed as grinding means while the two wheels R and L are carrying out a continuous engagement rotation. During the lapping, the additional movement(s) is/are being carried out in order to extend the lapping action to the total tooth flank surface of the two wheels T and R.

The relative movements of the two exemplary machines 10 and 20 of FIGS. 1 and 2 are identical. But the constellation and assignment of the individual linear axles LA1 through LA3 has been chosen differently in these examples.

Machines are being offered by the producers of lapping machines which differ from each other essentially by differently designed additional movements. Most lapping machines are able to carry out three linear movements, whereby the two horizontal movements LA1, LA2 are a must, since otherwise a shifting of the pinion R would quickly use up the backlash and thus result in a clamping, if the crown gear T would not be moved alongside correspondingly. A vertical axis LA3 is required for the lapping of hypoid gears in order to adjust the axial offset and it can of course be used to displace the bearing pattern during the lapping.

Those machines which are to be automatically fed, at least one of the linear axles (e.g. the linear axle LA2 in FIG. 2) has to have a long displacement range in order to be able to remove the pinion R first and then the crown gear T. For removing the gears R and T a sufficiently large distance between the gears R and T is to be provided.

In order to be able to guarantee high precisions and stiffness, the linear axles of such testers 10 and lapping machines 20 have to be implemented constructively complex and precisely. This results in technically complex and expensive machines.

SUMMARY OF THE INVENTION

It is an objective of the present invention to develop a machine constellation which is sufficiently stiff in order to be able to be employed for the measurement/examination (testing) of gear wheel pairs as well as for the lapping of gear wheel pairs.

The invention is intended to enable a precise and reliable measurement/examination (testing) of gears, such as for instance a gear wheel pair, which comprise a pinion and a crown gear.

In particular, spiral bevel gears are concerned which are to be tested and/or lapped.

An apparatus of the invention is characterized by the features of the claim 1. A facility of the invention comprises at least one such apparatus as well as the additional features of claim 9.

Further preferred embodiments are given in the respective dependent claims.

The construction of the inventive apparatus or facility with two linear axles and at least one swivel axis is very advantageous since it guarantees a high inner stiffness and thus precision. In addition, it is regarded to by an advantage that due to the pivoting movement of one of the two gears a simple charging or removal of gears becomes possible.

BRIEF DESCRIPTION OF THE DRAWINGS

Further details and advantages of the invention are described in the following by means of implementation examples and with reference to the drawings.

DETAILED DESCRIPTION OF THE INVENTION

In connection with the present description, terms are used which also find use in relevant publications and patents. It is noted however, that the use of these terms shall merely serve a better comprehension. The inventive idea and the scope of the patent claims shall not be limited in their interpretation by the specific selection of the terms. The invention can be transferred without further ado to other systems of terminology and/or technical areas. In other technical areas, the terms are to be employed analogously.

Lapping is herein referred to as meshing rotation of two gear elements (e.g. a crown gear T and a pinion R) with each other, whereby a contact is caused between the tooth flanks of the gear elements T and R and where a lapping agent is introduced in order to cause a removal on the gear elements T and R. The means for the introducing of the lapping agent are not shown in the figures since such solutions are well known to a person skilled in the art.

The apparatus 100 of the invention is specially designed for the lapping or testing of gears. It comprises a first spindle group 111 (preferably in the form of a spindle head 101 with spindle 102 rotatably mounted therein) for chucking a first gear T. The first gear T is rotatably mounted about a first axis of rotation TA in the first spindle group 111. The first axis of rotation TA runs parallel to the plane of the drawing; it thus is a horizontal axis.

The apparatus 100 comprises a second spindle group 112 (preferably in the form of a spindle head 103 with spindle 104 rotatably mounted therein) for chucking a second gear R, whereby the second gear R is rotatably mountable about a second axis of rotation RA in the first spindle group 111. In the position shown, the second axis of rotation RA runs parallel to the plane of the drawing, too.

All embodiments of the spindle groups 111 and 112 can be equipped with mounting means (e.g. in the form of a chuck) for the chucking of gears T, R. An exemplary chuck 115 of the spindle group 112 is visible in FIG. 5 in outlines.

Figure 3A:
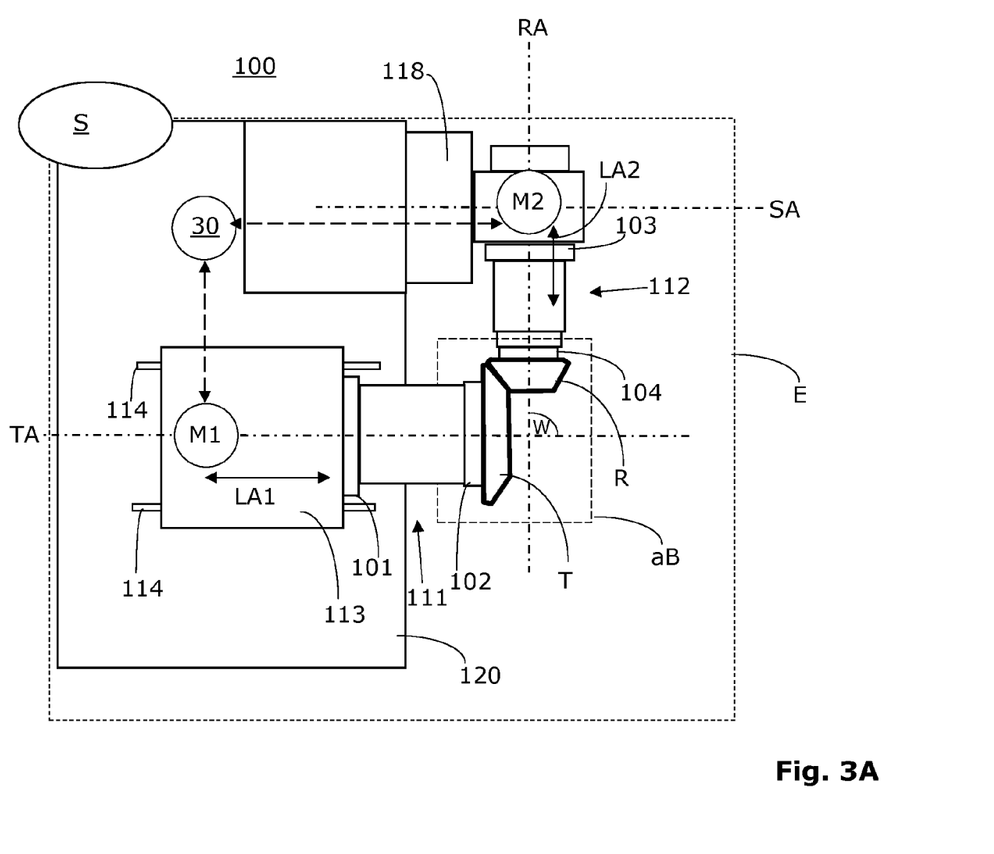
FIG. 3A shows a schematic top view of a first inventive apparatus, which is designed in order to bring a pinion and a crown gear into engagement and to cause them to roll with each other.
Figure 3B:
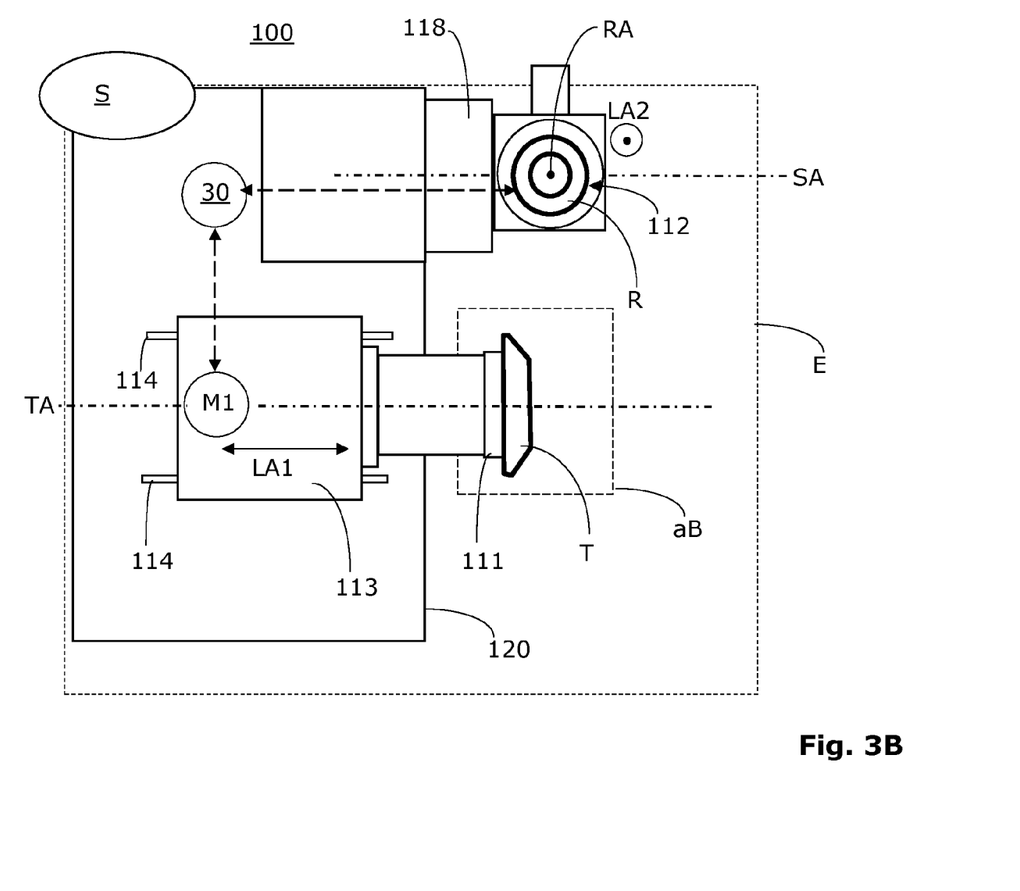
FIG. 3B shows a schematic top view of the first apparatus of FIG. 3A, wherein the pinion is moved out of an active area by means of a pivoting movement about a swivel axis.

Preferably, the spindle groups 11 and 112 of all embodiments of the invention are each driven by a separate revolution-controlled electric motor M1 and M2. The electric motors M1 and M2 can be synchronously connected/coupled with a timed interdependence by means of an electronic gearbox 30, also called electronic shaft. These connections/couplings of the two motors M1 and M2 and the corresponding gear train 30 are shown in FIG. 3A and FIG. 3B in a purely schematic form. It is sufficiently known to synchronously connect two electric motors M1 and M2 with an electric control system, respectively an electronic gearbox (see for instance the patent specifications CH 582 038 or EP 0 263 947).

Furthermore, a first linear axle LA1 is provided which serves for carrying out a first linear movement of the first spindle group 111 including the first gear T relative to the second spindle group 112 including the second gear R. In the embodiment shown in FIG. 3A, actually the spindle 102 of the first spindle group 111 including the first gear T can be horizontally linearly displaced. The first linear axle LA1 enables a displacement parallel with respect to the first axis of rotation TA. The first linear axle LA1 can be realized in form of a slide, for instance, which is guided along rails or notches 114, as indicated in FIG. 3A. The rails or notches 114 are here running along a machine bed or—frame 120 parallel to the axis of rotation TA.

Furthermore, a second linear axle LA2 is provided which serves for carrying out a second linear movement of the first spindle group 111 including the first gear T relative to the second spindle group 112 including the second gear R. In the embodiment which is shown in FIGS. 3A and 3B the second spindle group 112 including the second gear R can be moved parallel with respect to the second axis of rotation RA by the second linear axle LA2. In this concrete embodiment, the second linear axle LA2 is designed das auxiliary axis which is carried by the swivel axis SA. Details of the swivel axis SA are described in the following.

Depending on the implementation, the linear movements can be done so that the spindle head as a whole is being displaced (like for instance the first spindle group 111 in FIG. 3A) or that only the spindle as such is displaced (such as the second spindle group 112 in FIG. 3A). In the latter case, the corresponding linear axle (here for instance the linear axle LA2) is situated on a swivel axis (here for instance the swivel axis SA).

In order to operate a lapper or tester without the possibility of adjusting the shaft angle, at least five axles are required. According to the present state of the art, as described at the beginning in connection with FIGS. 1 and 2, these are three linear axles (e.g. LA1, LA2, LA3) as well as two rotational axles (e.g. RA and TA) for the rotations of the pinion R and crown gear T. If the shaft angle is to be adjustable, a sixth axle in the form of an axis of rotation is to be present in order to enable the rotation of the pinion spindle head, for instance.

Instead of providing a third linear axle (e.g. LA3), as is the case in the example of the FIGS. 1 and 2, the invention provides a swivel axis SA, which is designed for the pivoting of the first spindle group 111 including the first gear T or for the pivoting of the second spindle group 112 including the second gear R about this swivel axis SA. In the implementation example which is shown in FIGS. 3A and 3B actually the second linear axle LA2 with the second spindle group 112 including the second gear R can be pivoted about the swivel axis SA. Here, the swivel axis SA runs parallel with respect to the drawing plane and parallel with respect to the axle TA.

All embodiments of the invention thus have at least five axles, wherein two axles are implemented as linear axles so that the pinion R and the wheel T can be moved horizontally in the machining- or testing position. In all embodiments three axles are implemented as axis of rotation in order to enable rotations of the pinion R (about the axle RA) and wheel T (about the axle TA) and the pivoting of one of the gears R or T. The respective axis of rotation is herein referred to as swivel axis SA.

If in addition the shaft angle is to be adjustable in an embodiment of the invention, this is possible with an additional swivel axis for the wheel T. If the shaft angle is zero, both axles are pointing perpendicularly upwards.

The implementation of the swivel axis SA with spindle 104 and integrated linear movement axle LA2 can optionally be implemented in connection with all embodiments for the wheel T as it is implemented for the pinion R.

The swivel axis SA of all embodiments can be carried out as axle (here for a better distinction called main axle) which carries at least one auxiliary axle (in FIGS. 3A and 3B the second linear axle LA2 and the axis of rotation RA are designed as auxiliary axles which are carried by the swivel axis SA as main axle).

In the embodiment of FIGS. 3A and 3B, the axis of rotation TA and the swivel axis SA can be projected into a common plane E.

The apparatus 100 is shown in FIG. 3A in a machining position in which both gears T and R are present in an active (machine) area aB (also called machining area). The measurement, examination (testing) or the lapping takes place in this active area aB.

In accordance with the invention, a pivoting movement about the swivel axis SA can be carried out in order to introduce a gear R and/or T into the active area aB or to remove a gear R and/or T from this area aB. One of the gears (in case of FIGS. 3A and 3B the pinion R) is guided out of the active area aB by pivoting it about the swivel axis SA. The respective position is herein called handling position.

FIG. 3B shows a schematic top view of the first apparatus 100 wherein the pinion R was removed from the active area aB by pivoting about the swivel axis SA. The pinion R is in the removal position shown in a horizontal orientation. The pinion axle RA stands perpendicular on the drawing plane. Due to the pivoting the second linear axle LA2, too, has come into another orientation in space. The second linear axle LA2 now stands perpendicular on the drawing plane, too.

Figure 4:
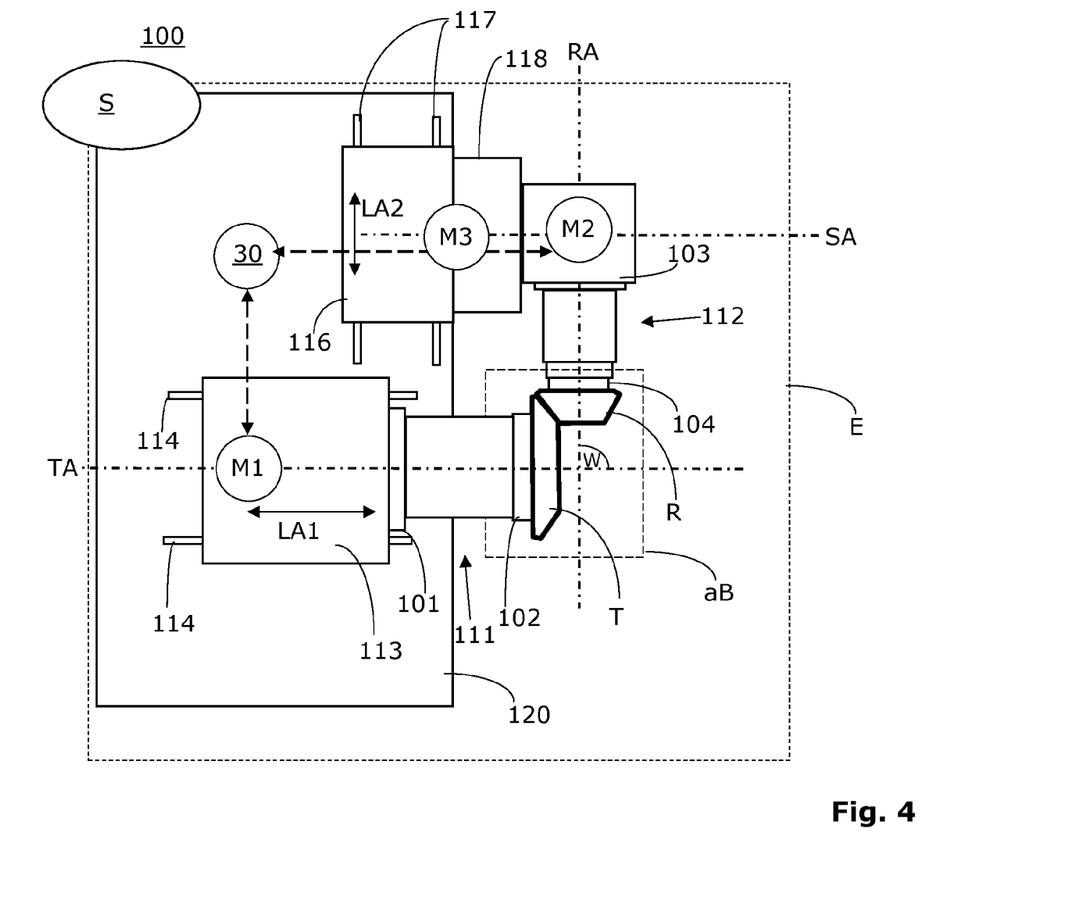
FIG. 4 shows a schematic top view of a further apparatus of the invention.

A further embodiment, which is designed for the lapping or testing of gears T, R, is shown in FIG. 4. The apparatus 100 comprises a first spindle group 111 for the chucking of a first gear T, whereby the first gear T is mounted rotatably about a first axis of rotation TA on the first spindle group 111. Furthermore, a second spindle group 112 for the chucking of a second gear R is provided, whereby the second gear R is mounted rotatably about a second axis of rotation RA on the second spindle group 112.

In the embodiment of FIG. 4, a first linear axle LA1 serves the purpose of carrying out a linear displacement of the first spindle group 111 including the first gear T. The first spindle group 111 can be displaced relative to the second spindle group 112. The first linear axle LA1 might comprise a slide 113 and two guiding rails or notches 114, as shown in FIG. 4 (corresponding to FIGS. 3A and 3B).

In the embodiment of FIG. 4, a second linear axle LA2 serves the purpose of carrying out a second linear displacement of the second spindle group 112 including the second gear R. The first spindle group 111 can be displaced relative to the second spindle group 112. The second linear axle LA2 might comprise a slide 116 and two guiding rails or notches 117, as shown in FIG. 4 (here lies a difference as compared to FIGS. 3A and 3B).

The apparatus 100 comprises a swivel axis SA for the pivoting of the second spindle group 112 including the second gear R. The second linear axle LA2 is not pivoted, which is different than in the embodiment of the FIGS. 3A and 3B. The second linear axle LA2 virtually serves as main axle while the swivel axis SA is designed as auxiliary axle of this main axle.

If, in the embodiment of FIG. 4, one realizes the constellation of axis or the building module on the side of the wheel T like it is on the side of the pinion R, then one obtains an inventive apparatus 100 (not shown in a separate drawing) with an additional swivel axis and with two identical building modules.

In further embodiments of the invention, which are not shown in a separate drawings, both linear axles LA1 and LA2 can be arranged in the area of the first spindle group 111, for instance, while the second spindle group 112 is not linearly moveable, and/or vice versa.

The swivel axis SA for pivoting one of the two spindle groups 111 or 112 is preferably in all embodiments implemented in form of a swivel drum 118. The drive engine or engines (e.g. an electric motor M3, as exemplary shown in FIG. 4) for carrying out the pivoting movement about the swivel axis SA preferably is/are positioned on a side of the apparatus 100 which is pointing away from the active area aB, and it/they is/are connected with said spindle group 11 or 112 via a transmission mechanic which is not shown. The mechanical structure is chosen so that the pivoting about the swivel axis SA occurs essentially free of clearance.

Preferably, the swivel axis SA of all embodiments is designed so that it facilitates at least a pivoting movement of 90 degrees (e.g. from the 0-degree position in FIG. 3A into the 90-degrees position in FIG. 3B).

Figure 5:
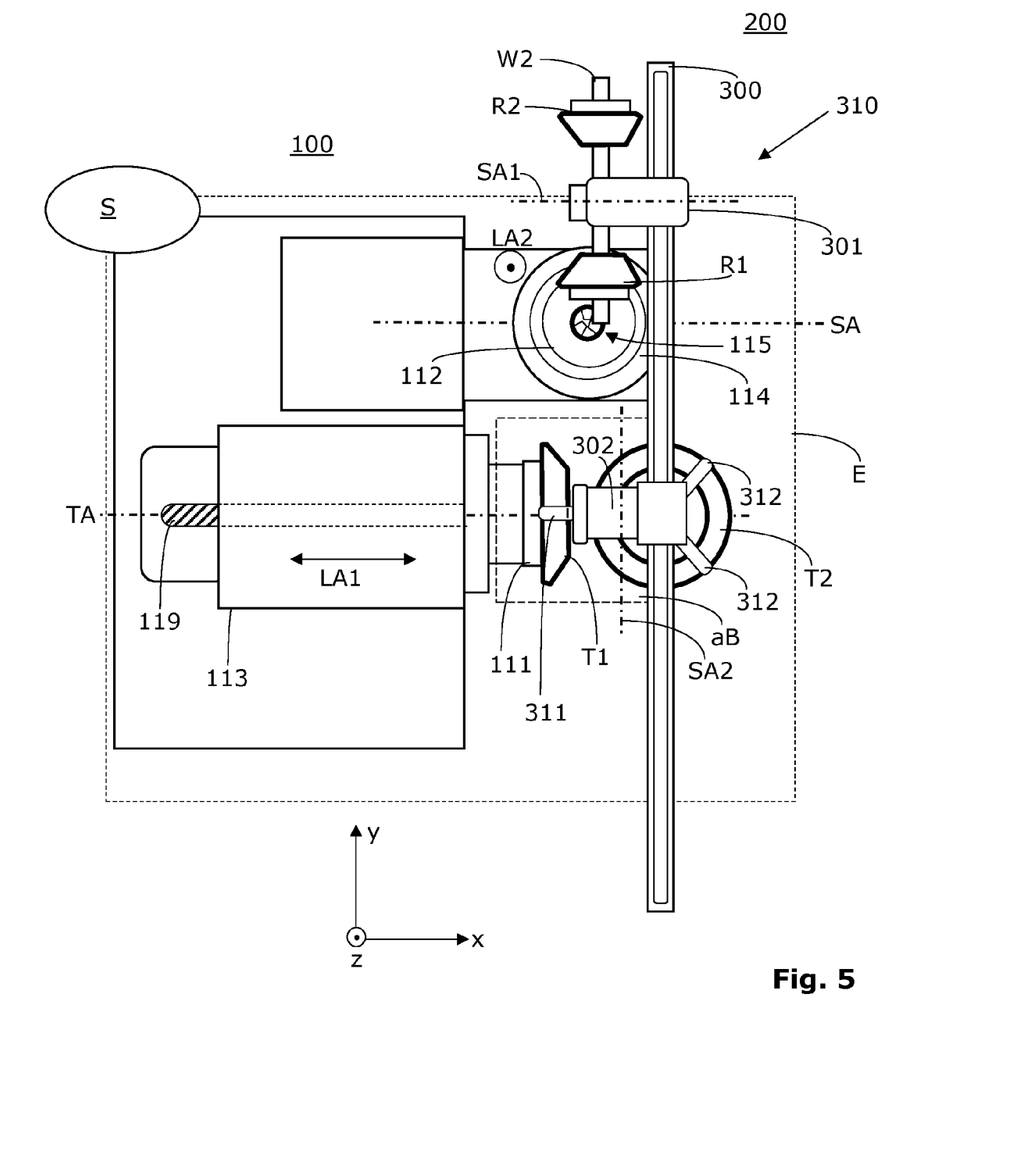
FIG. 5 shows a schematic top view of a further apparatus of the invention, said apparatus comprising a portal being equipped with two moveable gripper groups which facilitate crown gears and pinions to be loaded and removed.

The linear axles LA1 and/or LA2 of all embodiments may comprise a spindle drive rather than a rail-guided slide, which generates a linear movement by a motor driven rotation of a threaded spindle 119 about a spindle axis (as exemplary illustrated in FIG. 5).

A further embodiment of the invention is shown in FIG. 5 which comprises a spindle drive with a threaded spindle 119. If this threaded spindle 119 is rotated driven by a motor, the slide 113 is horizontally displaced, as indicated by a double arrow LA1.

It is particularly advantageous for the apparatus 100 of the invention to be integrated into a semi or fully automated facility 200. Such a facility 200 in this case comprises at least one apparatus 100 and a controllable gripper 310. The controllable gripper 310 is displaceable relative to the apparatus 100, as indicated in the schematic top view in FIG. 5. A (horizontal) portal 300 is provided in the example shown which bridges at least one part of the apparatus 100.

In order to be able to better describe the exemplary embodiment, an x-y-z coordinate system is shown in FIG. 5. The (horizontal) portal 300 lies parallel to the x-y-plane and extends along the y-axis. In order to be able to feed one of the gears T and/or R into or to remove it from the apparatus 100, the gripper 310 is equipped with a first apparatus or device 301 for the handling of the first gear T and/or with a second apparatus or device 302 for the handling of the second gear R.

Preferably, the apparatus 301 and/or 302 of all embodiments of the invention can be displaced along the portal 300 and it can be moved up and down parallel to the z-axis.

FIG. 5 shows a special facility 200, the gripper 310 of which comprises a first apparatus 301 for the handling of the first gear T as well as a second apparatus 302 for the handling of the second gear R.

In order to accelerate the charging and removal of gears R, the first apparatus 301 in all embodiments preferably is designed as double-apparatus which can handle two pinions R1 and R2 concurrently.

A moment after the removal of the pinion R1 from the spindle group 112 is shown in FIG. 5. In this moment the first apparatus 301 carries the pinion R1 as well as the pinion R2. By the execution of a 90-degrees pivoting movement about a swivel axis SA1, the pinion R2 can be brought into downwards pointing position. If now the first apparatus 301 is positioned right above the spindle group 112 and a lowering movement parallel to the negative z-axis is carried out, the shaft W2 of the pinion R2 can be inserted into the chuck 115 of the spindle group 112 and clamped therein.

In order to accelerate the charging and removal of gears T, the second apparatus 302 of all embodiments is preferably designed as double apparatus which can handle two crown gears T1 and T2 concurrently. A moment right before the removal of the first crown gear T1 from the spindle group 111 is shown in FIG. 5. Gripper arms 311 of the second apparatus 302 already have embraced the first crown gear T1. The first crown gear T1 still is in a vertical orientation while the second crown gear T2, which as next is to be clamped in the spindle group 111, is in a horizontal orientation. Two of the three gripper arms 312, which are grabbing the second crown gear T2, are visible in FIG. 5. The second crown gear T2 can be brought into the current position of the first crown gear T1 by carrying out a 90-degrees pivoting movement about a swivel axis SA2. The first crown gear T1 then is in a horizontal orientation above the portal 300.

It is to be mentioned in connection with FIG. 5 that the apparatus 100 of the facility 200 is not in the machining but in the handling position. The apparatus has been brought from the machining position into the handling position by a pivoting about the swivel axis SA. The spindle group 112 is oriented in the handling position after the pivoting of the chuck 115 so that the shaft W2 of the pinion R2 can be inserted into an opening of the chuck 115.

In all embodiments, the apparatus 100 of the invention may comprise a machine bed or a machine frame 120 which carries the individual elements of the apparatus 100 and which grants sufficient stiffness to the whole constellation. The gripper 310, if present, of all embodiments of the facility can be connected to the machine bed or frame 120 or it can be carried out separately therefrom.

Preferably, all embodiments of the apparatus 100, respectively the facility 200 comprise an NC-drive system S. In all FIGS. 3A to 5, the NC-drive system S is represented by an oval only. The NC-drive system S is in operative connection with all essential elements of the apparatus, respectively the facility 200. In all embodiments in this case at least the two linear axles LA1 and LA2 as well as the swivel axis are numerically controlled axles.

As needed, a separate control may be provided for the control of the gripper 310. But the NC-drive system S can also be employed for controlling the movements of the gripper 310.

In all embodiments that swivel axis SA1 and/or SA2 can by positioned other than in FIG. 5.

In all embodiments a facility 200 might comprise one or more robot arms instead of a portal arrangement 300, as shown in FIG. 5, which is/are carrying out the handling of the gear/s T and/or R.

Preferably, all embodiments of the apparatus 100 comprise two axis of rotation RA and TA, two linear axis LA1, LA2 and one swivel axis SA.

Preferably, all embodiments of the apparatus 100 comprise sensors (e.g. angular encodes or path encoders) in order to monitor and control the testing and/or lapping.

Preferably, all embodiments of the apparatus 100 comprise two spindle axis SA, whereby one of the swivel axis is assigned to the first spindle group 111 and one of the swivel axis is assigned to the second spindle group 112. In such an apparatus 100 with two swivel axis one can adjust shaft angles unequal 90-degrees when paring the gears T and R. One can also test spur gear pairs in such an apparatus 100 if both spindle groups 111 and 112 have been pivoted by 90 degrees so that the axis of rotation TA and RA run parallel with each other and are perpendicular with respect to the plane E.

What is claimed is:

1. An apparatus for the lapping or testing of gears, comprising:
   at least five axes, said at least five axes including
      a first axis of rotation, wherein the apparatus includes a first spindle group for chucking a first gear, whereby the first gear is mountable on the first spindle group so that it is rotatable about the first axis of rotation;
      a second axis of rotation, wherein the apparatus includes a second spindle group for chucking a second gear, whereby the second gear is mountable on the second spindle group so that it is rotatable about the second axis of rotation;
      two linear axes configured to perform linear displacements of the first spindle group with the first gear relative to the second spindle group with the second gear, said two linear axes defined by
         a first linear axis oriented to perform a first linear displacement of the first spindle group with the first gear relative to the second spindle group with the second gear; and
         a second linear axis oriented to perform a second linear displacement of the first spindle group with the first gear relative to the second spindle group with the second gear; and
      one or more of:
         a first swivel axis oriented to perform pivoting of the first spindle group with the first gear thereabout, wherein said first swivel axis is parallel to the second axis of rotation; or
         a second swivel axis oriented to perform pivoting of the second spindle group with the second gear thereabout, wherein said second swivel axis is parallel to the first axis of rotation.

2. An apparatus according to claim 1, wherein the apparatus defines said first swivel axis and said second swivel axis, and wherein the apparatus is configured such that pivoting at least one of the first spindle group about the first swivel axis and the second spindle group about the second swivel axis provides a shaft angle unequal to 90 degrees between the first gear and the second gear.

3. An apparatus according to claim 1, wherein, in a machining position of the apparatus, the first axis of rotation is positionable perpendicularly with respect to the second axis of rotation so that the first gear and the second gear are engaged within an active area of the apparatus.

4. An apparatus according to claim 3, wherein, in a handling position of the apparatus, the first axis of rotation is pivoted with respect to the second axis of rotation and one of the first gear and the second gear is located within the active area.

5. An apparatus according to claim 1, further comprising an active area in which the first gear is engageable with the second gear and driveable.

6. An apparatus according to claim 1, wherein the apparatus defines said first swivel axis wherein the first swivel axis is configured so that the first gear, by pivoting the first spindle group with the first gear, is removable from an active area of the apparatus.

7. An apparatus according to claim 1, wherein the apparatus defines said second swivel axis, wherein the second swivel axis is configured so that the second gear, by pivoting the second spindle group with the second gear, is removable from an active area of the apparatus.

8. A facility comprising at least one apparatus in accordance with claim 1, wherein the facility further comprises a controllable gripper which is displaceable relative to the at least one apparatus, and which is configured to at least one of feed one of the first and second gears into the at least one apparatus or remove the respective gear from the at least one apparatus.

9. A facility according to claim 8, wherein the gripper is configured to grab one of the first and second gears while the respective gear is mounted in its corresponding spindle group, and to remove the respective gear from the at least one apparatus after the respective gear is released by its corresponding spindle group.

10. A facility according to claim 8, wherein the gripper is configured to feed one of the first and second gears into the at least one apparatus, hand over the respective gear to its respective spindle group, and be removed from a movement area of the spindle groups after a chucking of the respective gear in its corresponding spindle group.

11. A facility according to claim 10, wherein the gripper comprises a first device configured to handle the first gear and a second device configured to handle the second gear.

* * * * *